United States Patent [19]

Long et al.

[11] 3,967,047

[45] June 29, 1976

[54] ELECTRODE COOLING APPARATUS

[75] Inventors: James Michael Long, Corvallis; Paul Alan Osterlund, Philomath, both of Oreg.

[73] Assignee: Evans Products Company, Portland, Oreg.

[22] Filed: Aug. 19, 1975

[21] Appl. No.: 605,867

[52] U.S. Cl. .......... 13/6; 13/17

[51] Int. Cl.² .......... C03B 5/02

[58] Field of Search .......... 13/6, 14, 15, 16, 17, 13/25

[56] References Cited

UNITED STATES PATENTS

| | | | |
|---|---|---|---|
| 1,542,716 | 6/1925 | Payne | 13/15 |
| 2,405,236 | 8/1946 | Rhoades et al. | 13/17 |
| 2,865,972 | 12/1958 | Augsburger | 13/17 |
| 3,249,675 | 5/1966 | Matchen | 13/16 X |

*Primary Examiner*—R. N. Envall, Jr.

*Attorney, Agent, or Firm*—Robert E. Howard

[57] ABSTRACT

An electrode cooling apparatus for an electric furnace which permits easy changing of the electrode holder and water tight seals. The electrode cooling apparatus has a cylindrical body with an inner and outer sealing assembly. The sealing assemblies are easily removed with a special tool which is used for assembling and disassembling both the inner and outer sealing assemblies.

4 Claims, 1 Drawing Figure

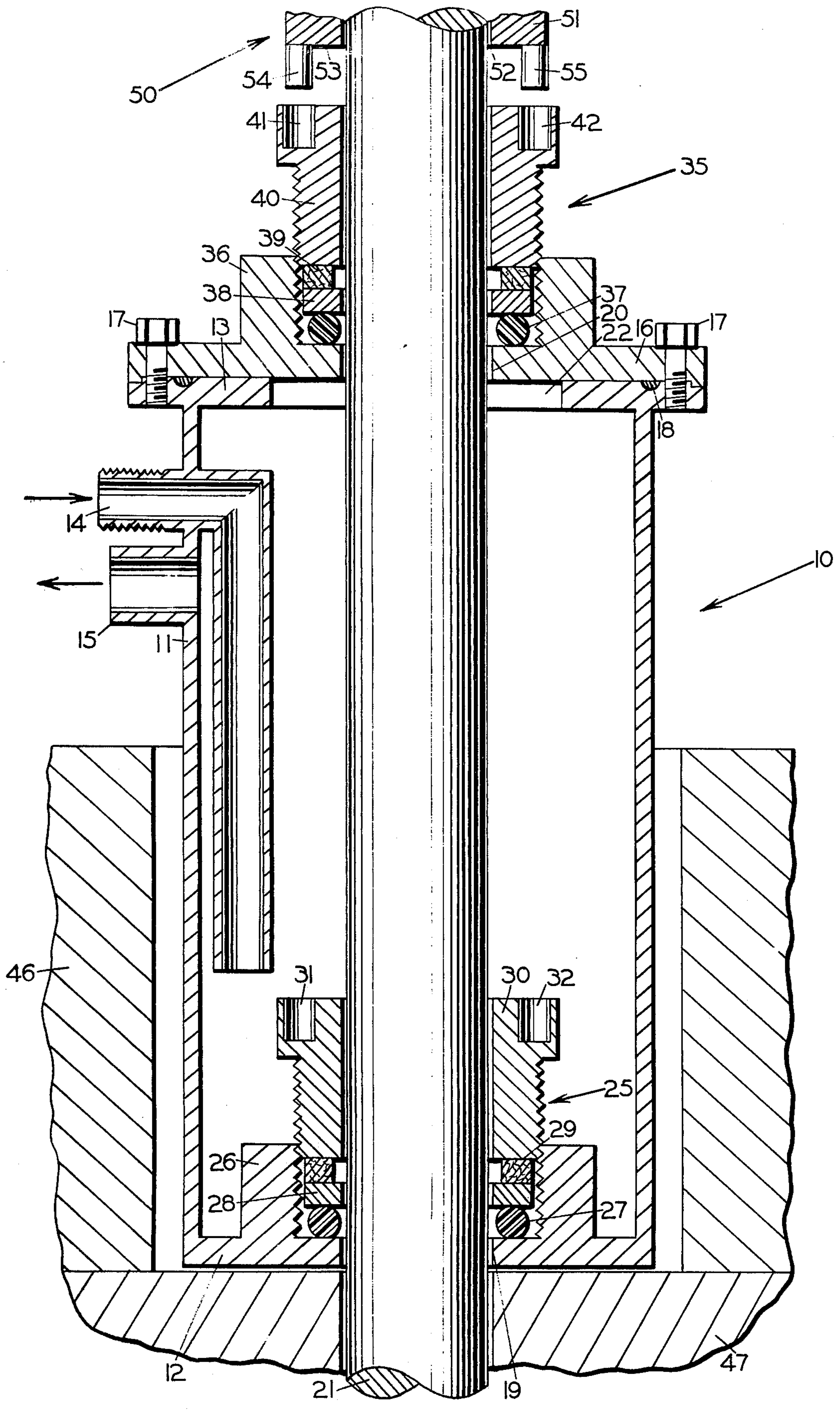
51
52
53
54
55
50
41
42
35
40
39
36
38
37
20
22
16
17
17
13
18
14
15
11
10
46
31
30
32
25
29
26
28
27
12
21
19
47

ELECTRODE COOLING APPARATUS

BACKGROUND OF THE INVENTION

Electric furnaces employing electrodes are used in many industries such as the glass industry. With particular reference to a furnace for melting glass, but without limiting the scope of the present invention thereto, it is common to employ an electrode cooling apparatus which is seated in the insulating refractory surrounding the furnace wall. The electrode cooling apparatus has provision for both cooling the electrode and sealing the electrode in the furnace wall so that molten glass does not flow therearound.

In the past, such electrode cooling means have been constructed in such a manner that when an electrode must be changed or when the material sealing the electrode in the cooling means must be replaced, the removal of the electrode cooling means from the insulating refractory surrounding the furnace wall has been a very time-consuming and laborious operation. In fact, it has not been uncommon for such operations to consume up to a day and a half of time.

It is therefore an object of the present invention to provide an electrode cooling means which permits rapid and easy changing of the electrode and/or replacing of the sealing material.

BRIEF SUMMARY OF THE INVENTION

The electrode cooling apparatus of the present invention may be used with electric furnaces such as those used for melting glass. The apparatus has a generally cylindrical body or can, the can having a top and bottom thereto, an opening in the bottom, top and lid to permit an electrode to pass therethrough, an inner sealing assembly located inside the cylindrical body and abutting the bottom thereof, said inner sealing assembly comprising an interiorily threaded female member, compressible sealing material located within the female member, and a male member exteriorily threaded and threadably engaged with the interiorily threaded female member, said male member having at least one tool receiving means located on the outwardly facing surface thereof, said male member containing an electrode receiving opening extending therethrough, and an outer sealing assembly located on the lid of said cylindrical body having a construction substantially identical to that of said inner sealing assembly.

DESCRIPTION OF PREFERRED EMBODIMENT

The preferred embodiment of the present invention will now be described with reference to the drawing in which the single FIGURE is a cross-sectional side view of the electrode cooling apparatus and associated tool.

In the drawing, the electrode cooling apparatus is generally indicated by reference numeral 10. The cooling apparatus 10 is comprised of a generally cylindrical body or can 11 having a bottom 12 and a top 13. A coolant inlet conduit 14 suitable for connecting to a source of coolant (not shown) communicates with the interior of can 11. A coolant outlet conduit 15 likewise communicates with the interior of can 11 to provide an exit for circulating coolant.

A lid 16 is fastened to the top of the can 13 by suitable fastening members 17 passing therethrough as illustrated. An O-ring 18 provides a sealing relationship between the top of the can 13 and lid 16.

The bottom 12 and the lid 16 have passageways 19 and 20, respectively, passing therethrough and are located centrally therein. Passageways 19 and 20 are slightly larger than an electrode 21 to be held by electrode cooling apparatus 10. The top 13 has an opening 22 which is sufficiently large to permit insertion of a tool member (to be described below) into the interior of can 11 upon removal of lid 16.

Located inside can 11, at the bottom thereof, is an inner sealing assembly indicated generally as 25. Inner sealing assembly 25 is comprised of an interiorily threaded female member 26 which is attached to bottom 12. Located within female member 26 are an O-ring 27, a pressure ring 28 and sealing material 29. Sealing material 29 can be any suitable material such as asbestos, the only criteria being that the material be able to withstand the high temperatures involved.

An exteriorily threaded male member 30 is threadably cooperative with female member 26, and in a completed assembly is tightened to compress O-ring 27, pressure ring 28 and sealing material 29 into sealing engagement between female member 26 and electrode 21. Located on the outwardly facing surface of male member 30 are two tool receivers 31 and 32. Tool receivers 31 and 32 are adapted to cooperate with a tool member in a manner which will be explained below. In the preferred embodiment illustrated, tool receivers 31 and 32 are illustrated as being cavities; however, the tool receivers 31 and 32 could be pins extending from the outwardly facing surface of male member 30. Also, while two such tool receivers have been illustrated, only one is required for the assembly and disassembly operation to be subsequently explained. The shape of the tool receivers 31 and 32, whether they are cavities as illustrated, or pins, not illustrated, is not critical and they may be generally cylindrical, square, triangular, etc.

An outer sealing assembly 35 is located on lid 16 in a manner and construction identical to that of inner sealing assembly 25. Thus, outer sealing assembly 35 is comprised of an interiorily threaded female member 36, sealing means located inside female member 36 comprising O-ring 37, pressure ring 38, and sealing material 39. An exteriorily threaded male member 40 is cooperatively secured inside female member 36 for compressing the 0-ring 37, pressure ring 38 and sealing material 39 into sealing relationship with electrode 21. Tool receivers 41 and 42 are located on the outwardly facing surface of male member 40 for receiving a tool member for disassembling or assembling the outer sealing assembly 35.

Electrode holder 10 is seated in an opening in the insulating refractory 46 located adjacent a furnace wall 47 of a suitable furnace (not illustrated). Electrode 21 extends through the furnace wall 47. In use, the electrode cooling apparatus 10 is horizontally disposed with coolant inlet 14 and coolant outlet 15 facing upward.

The tool, 50, for assembling and disassembling electrode holder 10 will now be described. Tool 50 is comprised of a generally cylindrical body 51 having an opening 52 therethrough which is large enough to slip over electrode 21. Extending from the inner end or face 53 of tool 50 are two tool receiver engaging means 54 and 55 which in the preferred embodiment are pins of such a size as to be received within tool receivers 31, 32, 41 and 42. As previously discussed, tool 50 could have engaging means 54 and 55 replaced by receiving opening similar to 31, 32, 31 and 42 and tool receivers 31, 32, 41 and 42 could be replaced by pin members to obtain the same effect. Also, the tool receivers and pins could be mixed so that, for example, tool receiver 31 could be a pin whereas tool receiver 32 could remain an opening, as shown, with tool 50 having only one pin member 55, pin 54 being replaced by an opening, and likewise with tool receivers 41 and 42.

In operation, the electrode cooling apparatus is assembled as illustrated with male members 30 and 40 being tightened with tool member 50 to provide sealing engagement between the inside of threaded female members 26 and 36 and electrode 21 by virtue of the compression of O-rings 27 and 37, pressure rings 28 and 38, and sealing material 29 and 39. The electrode cooling apparatus 10 and electrode 21 are inserted into the furnace wall and accompanying insulating refractory, as illustrated.

Alternatively, where the electrode 21 is already in place, electrode cooling apparatus 10 may be inserted around the electrode 21 as illustrated. When the necessity arises for replacing the electrode 21 or replacing the sealing material 29 and 39 or O-rings 27 and 37, tool member 50 is placed in a position so that tool receiver engaging means 54 and 55 engage tool receivers 41 and 42, electrode 21 being accommodated by opening 52 in tool 50. Male member 40 is then rotated so as to remove it from female member 36 thereby permitting access to O-ring 37, pressure 38 and sealing material 39.

To repair inner sealing assembly 25, fastening members 17 are removed and lid 16 thereby removed from the top 13 of can 11. Tool 50 is then inserted into the interior of the can with electrode 21 being accommodated by opening 52 therein, the tool being inserted far enough into the can so that tool receiver engaging means 54 and 55 engage tool receivers 31 and 32. Upon rotation of tool 50 male member 30 is removed from female member 26, and the O-ring 27, pressure ring 28 and/or sealing material 29 may be easily replaced without removal of electrode 21 from the furnace. During the latter operation, once male member 30 is backed-off, the entire electrode holder 10 can be removed from the insulating refractory 46 leaving electrode 21 inserted through furnace wall 47. This permits easy access to O-ring 27, pressure ring 28 and sealing material 29 and 39.

We claim:

1. In an electric furnace, the combination comprising an electrode, electrode cooling apparatus, and associated tooling; said electrode cooling apparatus having a body, coolant inlet and outlet ports in said body, and a top and bottom to said body; a removable lid secured to said top, electrode receiving openings in said bottom and said lid, and an electrode passing through said electrode receiving openings; an inner sealing assembly located about the electrode and electrode receiving opening in the bottom of said body and an outer sealing assembly located about the electrode and electrode receiving opening in the lid, said inner and outer sealing assemblies comprising a female member, compressible sealing material in said female member and a male member adapted to be received by said female member in a position to compress said compressible sealing material at its inner reach within said female member, said male member having tool receiving means located on the outer face thereof; and associated tool means having an electrode receiving passageway extending therethrough whereby said tool may be slipped over said electrode, and tool receiver engaging means located on the inner end of said tool means adapted to engage said tool receiving means on the outer face of said male member.

2. The apparatus of claim 1 wherein said male member is threadably engaged within said female member.

3. The apparatus of claim 1 wherein said tool receiving means is at least one cavity located within the outer face of said male member.

4. The apparatus of claim 3 wherein the tool receiver engaging means is at least one pin extending from the inner end of said tool.

* * * * *